United States Patent [19]

Kosich

[11] Patent Number: 4,937,862

[45] Date of Patent: Jun. 26, 1990

[54] REMOTE MONITORING DEVICE

[75] Inventor: Milo Kosich, Cuyahoga Falls, Ohio

[73] Assignee: Enforcement Support Incorporated, Cuyahoga Falls, Ohio

[21] Appl. No.: 260,728

[22] Filed: Oct. 14, 1988

[51] Int. Cl.$^5$ .................... G11B 23/28; H04M 15/04; H04M 15/18

[52] U.S. Cl. .......................................... 380/3; 380/4; 379/34; 379/112; 379/130; 379/133; 379/136; 379/140

[58] Field of Search ................... 379/34, 35, 112, 130, 379/133, 136, 140; 380/3, 4, 42

[56] References Cited

U.S. PATENT DOCUMENTS

| 4,013,839 | 3/1977 | Bell | 379/140 |
| 4,656,657 | 4/1987 | Hunsicker | 379/140 |
| 4,712,230 | 12/1987 | Rice et al. | 379/112 |
| 4,813,065 | 3/1989 | Segala | 379/112 |

OTHER PUBLICATIONS

JSI Telecon J1066 Dial-Up Slave System Users Manual, Undated (Unit appeared in the marketplace about May, 1987).

JSI Telecom J1033C Dialed Number Recorder Users Manual, Undated (Unit appeared in the marketplace about February, 1987).

Discovery Technical Manual published by Mitel Datacon, Issue 1, May, 1987.

Primary Examiner—Thomas H. Tarcza
Assistant Examiner—Linda J. Wallace
Attorney, Agent, or Firm—Buchanan Ingersoll; Lynn J. Alstadt

[57] ABSTRACT

A miniaturized DNR monitoring device is adapted to communicate over a telephone line, or otherwise, with a remote unit which may also communicate with other monitoring units. The monitoring device includes a computer chip program to select target DNR data from non-target DNR data, a memory for storing a limited amount of data, a DNR output line, means for downloading stored data over its output line to its remote unit on command or upon the occurrence of preselected events, and means for identifying transmissions to and from its remote unit by a handshake routine.

9 Claims, 3 Drawing Sheets

4,937,862

REMOTE MONITORING DEVICE

My invention relates to apparatus for DNR monitoring of telephone lines. It is more particularly concerned with apparatus comprising a miniaturized monitoring unit which is attached directly or indirectly to the telephone line to be monitored and communicates with a remote storage and processing unit. The remote unit can operate with several monitoring units.

Related Invention

Application Ser. No. 078593, now U.S. Pat. No. 4,815,120, filed July 28, 1987 by Milo Kosich for Computerized Telephone Monitoring System.

Background of the Invention

Various designs of apparatus for DNR wiretapping of telephones are known. Dialed number recording (DNR) usually records the number dialed, date, time and duration of the call. Title III wiretaps, so called, also record DNR information and, in addition, record the actual conversations occurring on the telephone line. My related application above identified is designed for Title III wiretaps.

A recent patent for DNR wiretapping is U.S. Pat. No. 4,712,230 of John E. Rice et al. dated Dec. 8, 1987. The apparatus there disclosed prints out for each call detected the number dialed, the time and date of the call, duration of the call and other information, such as whether the line was busy, the number of rings and whether there was voice communication. The data received from a line is printed on a paper tape, apparently in chronological order without any sorting out.

Summary of the Invention

My apparatus comprises a miniaturized monitoring device which is attached to the telephone line to be monitored, either directly or through a slave, and is adapted to communicate with a remote unit over a telephone line or otherwise. The remote unit may also communicate with a number of other monitors, if desired. Each monitor device loads its memory into the remote unit on command or, if the monitor memory nears capacity, or if the monitor loses power. The data from the monitor is encrypted or encoded at the monitor and is decoded at the remote unit. The data is transferred only after an appropriate handshake routine.

The remote unit may include a computer programmed to poll the various monitors for data pertinent to each particular wiretap, and a memory larger than can be accommodated in the monitoring device that stores the information received under an appropriate case number or analysis when desired.

Description of the Preferred Embodiments

Figure 1:
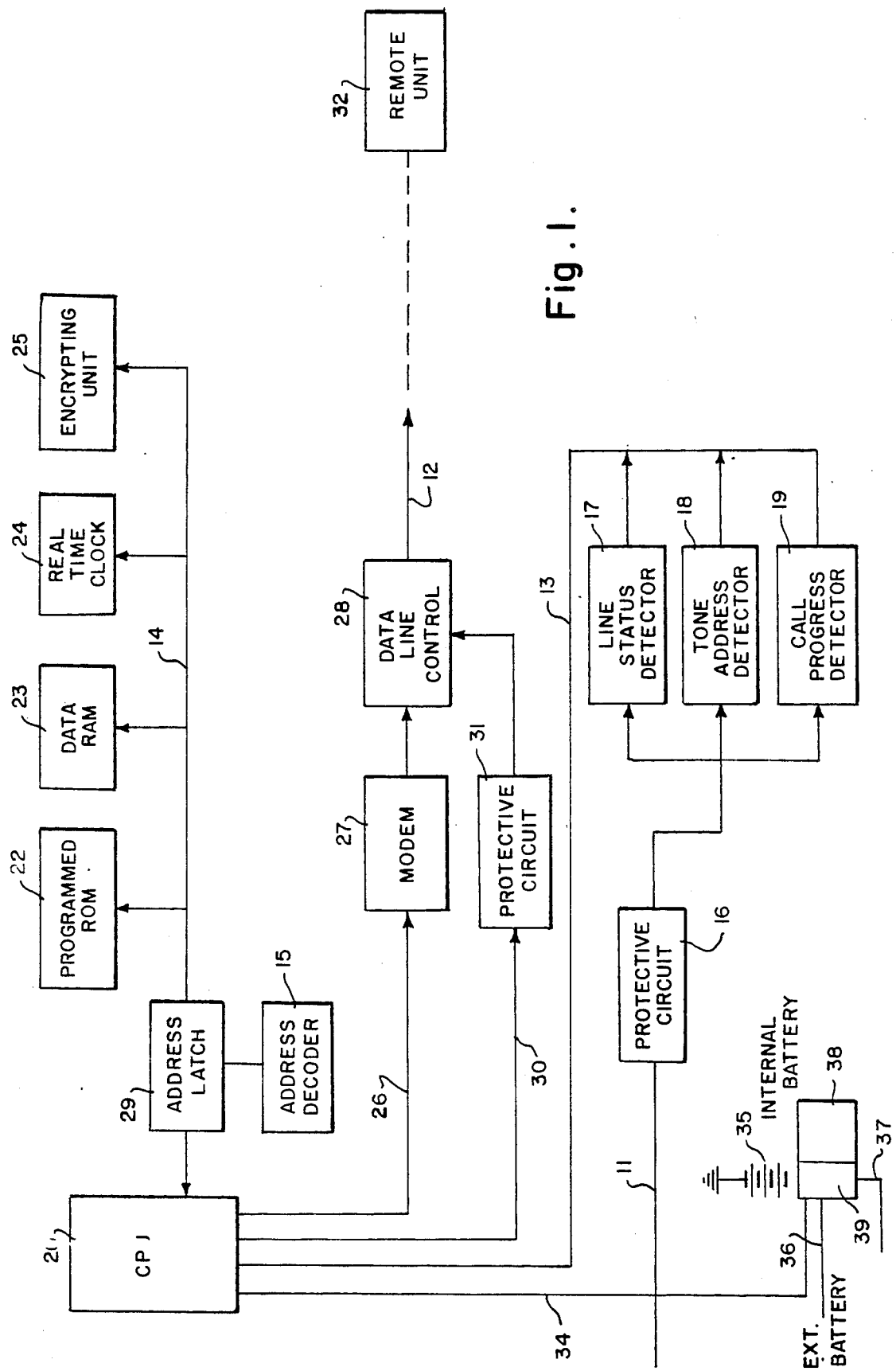
FIG. 1 is a block diagram of my monitor unit.

My monitor unit as is shown in FIG. 1 has an input or target line 11, an output or data line 12, an internal target line control bus 13 and an internal data address and address decoder bus 14. Line 11 at its input end is connected to the target telephone line, either directly or through a slave. In my monitor, target line 11 is connected through a conventional telephone surge protector 16 to a line status detector 17, a tone address detector 18 and a call progress detector 19 in parallel. The outputs of the above-mentioned detectors are also connected in parallel to target line control bus 13 which is connected to central processing unit 20. That unit is connected to bus 14 above mentioned to which are connected in parallel a programmed read-only memory 22, through address latch 29 and address decoder 15, a non-volatile data random-access memory 23, a real-time clock 24 and an encoding or encrypting unit 25. Bus 14 and some or all of the above-mentioned units connected thereto may be a part of the central processing unit 20.

Central processing unit 20 is also connected through line 26 and modem 27 to data line control unit 28, the output of which is data line 12 through which my monitor communicates with a remote unit 32 to be described. Line 12 may be a telephone line or other means of communication. Data line control unit 28 is controlled through conventional telephone surge protector apparatus 31 by signals received over line 30 from central processing unit 20.

Central processing unit 20 receives power over line 34 either from an internal battery 35, an external battery 36 or from external power line 37 through a power control unit 39 which includes a low-battery voltage detector and signaling device 38.

Figure 2A:
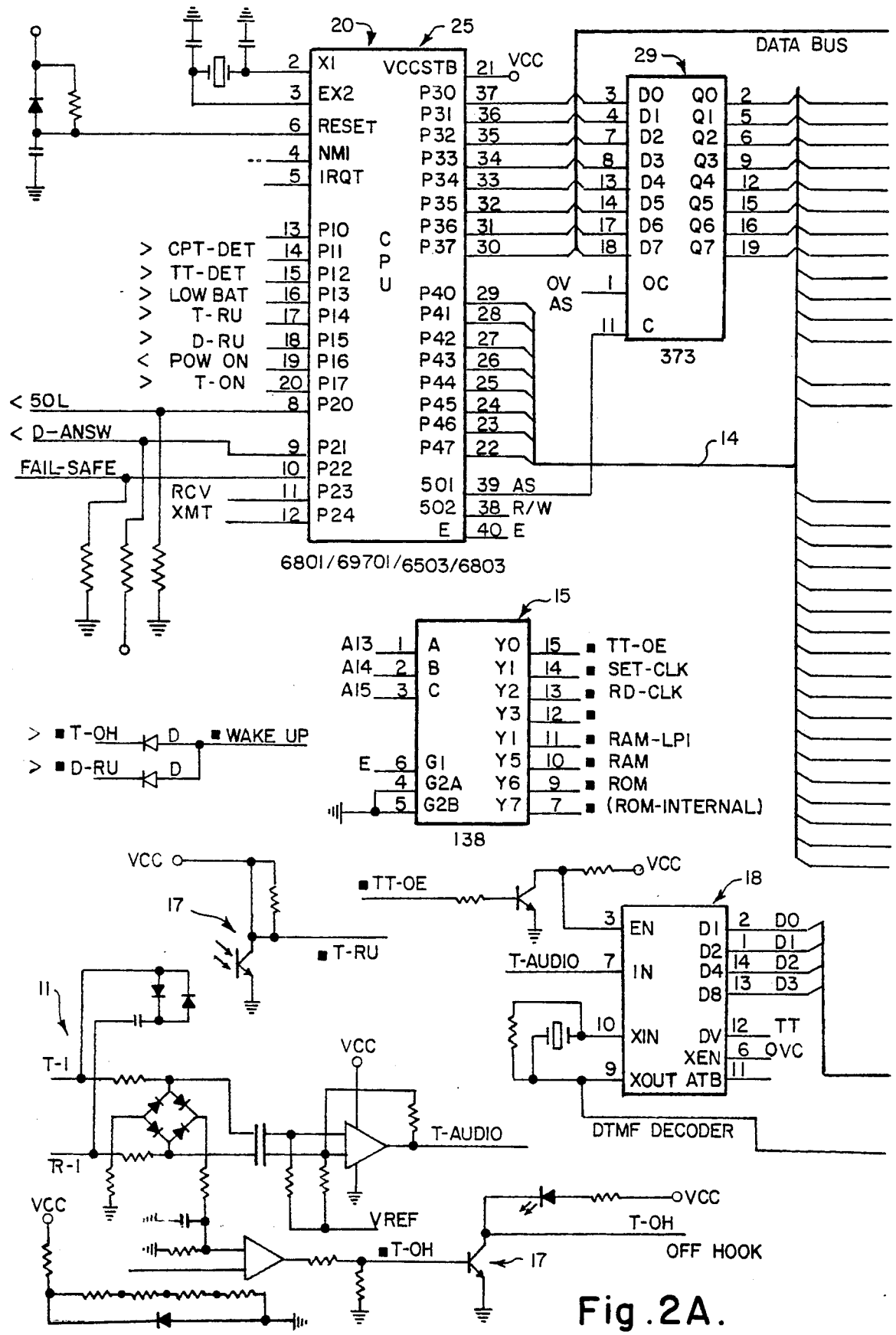
FIGS. 2A and 2B together are a schematic of the monitor unit of FIG. 1.
Figure 2B:
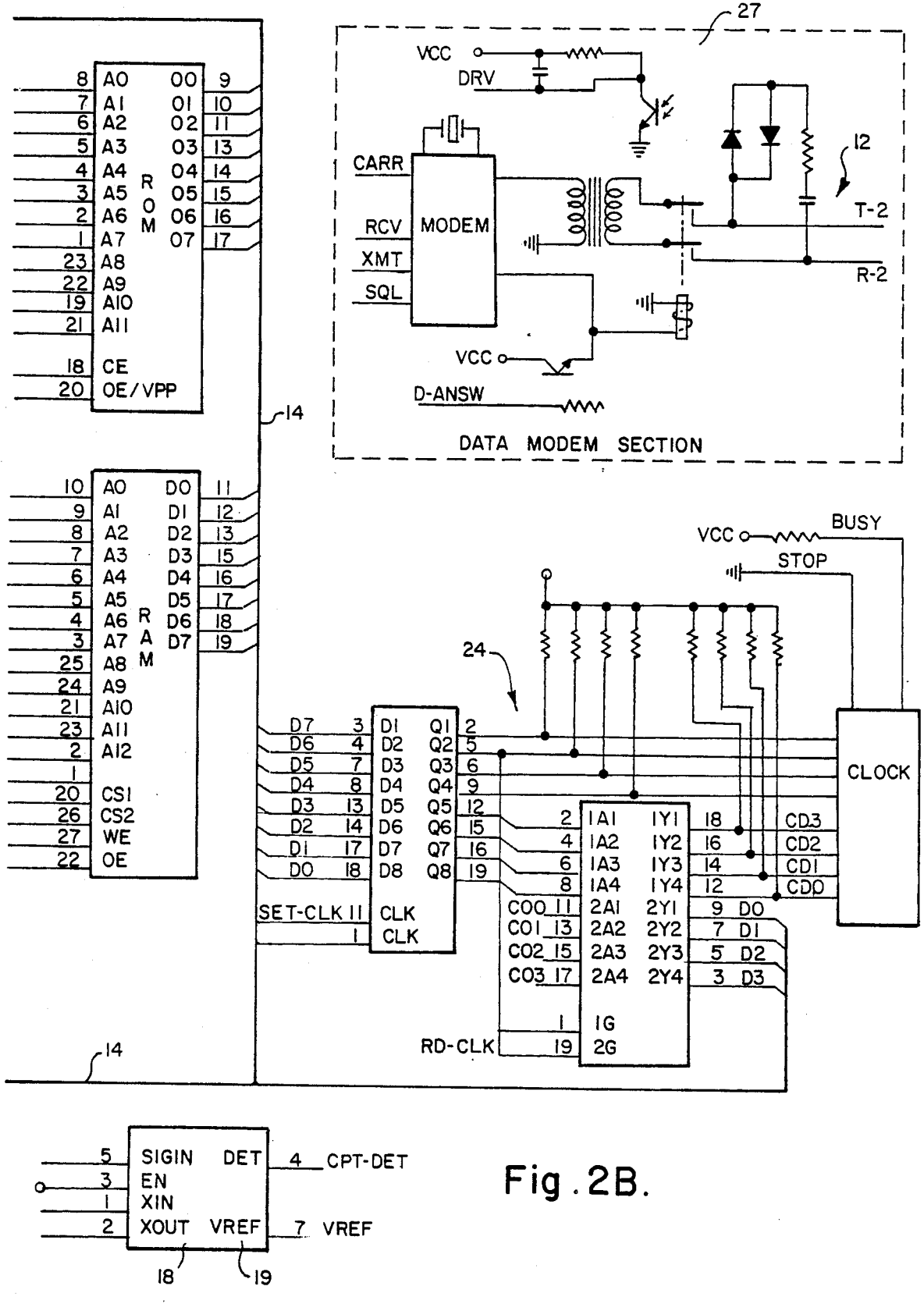

The schematic of FIGS. 2A and 2B includes all the components of the various units of the block diagram of FIG. 1 and the connections therebetween. As far as possible, the reference characters of FIG. 1 are applied to the components or groups of components of FIGS. 2A and 2B but in some cases the components of more than one unit are found on the same chip or in the same assembly, and in others, the components making up one unit are found on more than one chip. To avoid obscuring the schematic in such cases by a web of connecting conductors, the terminals of the chips or assemblies which are not shown by conductors as connected to terminals of other components, are marked with legends which can be matched with unconnected terminals of other units which are marked with corresponding legends. Terminals so marked are connected together. Where a single chip or assembly comprehends more than one of the units shown in FIG. 1, the reference characters of each of the units is applied.

As I have mentioned, my monitor is designed to be used in connection with a remote unit having a much larger memory than can be accommodated in a small monitor. The computer in the remote unit 32 is programmed to call each monitor unit periodically over data line 12 and in response thereto, each monitor downloads its stored data from memory 23 into the storage means of the remote unit. Before doing so, the monitor and the remote unit identify each other in a handshake routine which, in the monitor, is one of the functions of the encrypting unit 25. In my monitor, every change in voltage on the target line 11 is transmitted over target line control bus 13 to central processing unit 20, is timed and dated by clock 24, and is stored in data memory 23. Thus, on incoming calls, my monitor can distinguish between pulse or dialtone dialing and, by the interdigital spacing, can determine when the call is dialled by hand, by modem, or by speed dialer. Where more than one telephone is on the target line, my monitor can in most cases determine which instrument is making a given call. It is unable to do so only when identical instruments are dialled in identical fashion.

The units 17, 18 and 19 previously mentioned as being on the target line bus 13 determine time off hook, time on hook, direction of call (incoming or outgoing), type of call (dialtone or pulse), number of digits dialled, number of rings (incoming or outgoing), unanswered calls, aborted calls, the time when the monitor went off-line, for low voltage or other reason, and the time when the monitor came back on-line. The data in the monitor memory 23 is preserved during downtime and can be transferred to the remote unit when the monitor is back on-line. The components of the monitors described herein are adjusted and connected to call the computer in remote unit 32 and download the data from monitor memory 23 when that memory is nearly full, when the monitor batteries are low, when a predetermined phone number has been detected, or when other programmable preconditions have been met.

I claim:

1. In an apparatus for dialed number recording monitoring device connected to the line at the target for detecting data from the line, the improvement comprising:
   (a) storage means in the monitoring device for storing a limited amount of dialed number recording data detected by said monitoring device;
   (b) means in the monitoring device including a clock for identifying each item of target dialed number recording data;
   (c) microprocessor means in the monitoring device capable of selected target dialed number recording data from non-target dialed number recording data detected;
   (d) memory connected to said microprocessor means and containing a program for calling, answering and downloading at least one of data in said storage means, data identifiers and selected target dialed number recording data, through a data transmission line; and
   (e) a data transmission line for at least one of calling, answering and downloading stored dialed number recording data to a remote unit.

2. Apparatus of claim 1 including a modem in said dialed number recording data transmission line controlled by said microprocessor means.

3. Apparatus of claim 1 including means for automatically downloading data in said storage means into said dialed number recording transmission line upon recurrence of a predetermined event programmed into said memory.

4. Apparatus of claim 3 in which the predetermined event is the failure of a power supply.

5. Apparatus of claim 3 in which the predetermined event is storing of said limited amount of dialed number recording data.

6. Apparatus of claim 3 including means controlled by said microprocessor for encrypting data stored in said storage means.

7. Apparatus of claim 3 including means for recognizing a handshake signal received over said dialed number recording data transmission line.

8. Apparatus of claim 3 including means for transmitting a handshake signal over said dialed number recording data transmission line prior to downloading.

9. Apparatus of claim 1 including means for downloading data in said storage means into said dialed number recording data transmission line on receipt of an incoming signal on said dialed number recording data transmission line.

* * * * *

UNITED STATES PATENT AND TRADEMARK OFFICE
CERTIFICATE OF CORRECTION

PATENT NO. : 4,937,862

DATED : June 26, 1990

INVENTOR(S) : MILO KOSICH

It is certified that error appears in the above-identified patent and that said Letters Patent is hereby corrected as shown below:

Column 3, line 10, claim 1, after "monitoring" insert --of a target telephone line including a power operated monitoring--.

Column 3, line 30, claim 1, change "selected" to --selecting--.

Signed and Sealed this

Seventeenth Day of September, 1991

*Attest:*

HARRY F. MANBECK, JR.

*Attesting Officer*   *Commissioner of Patents and Trademarks*